C. A. GARVEY.
SHOCK ABSORBER FOR VEHICLES.
APPLICATION FILED MAR. 9, 1910.
991,437.
Patented May 2, 1911.
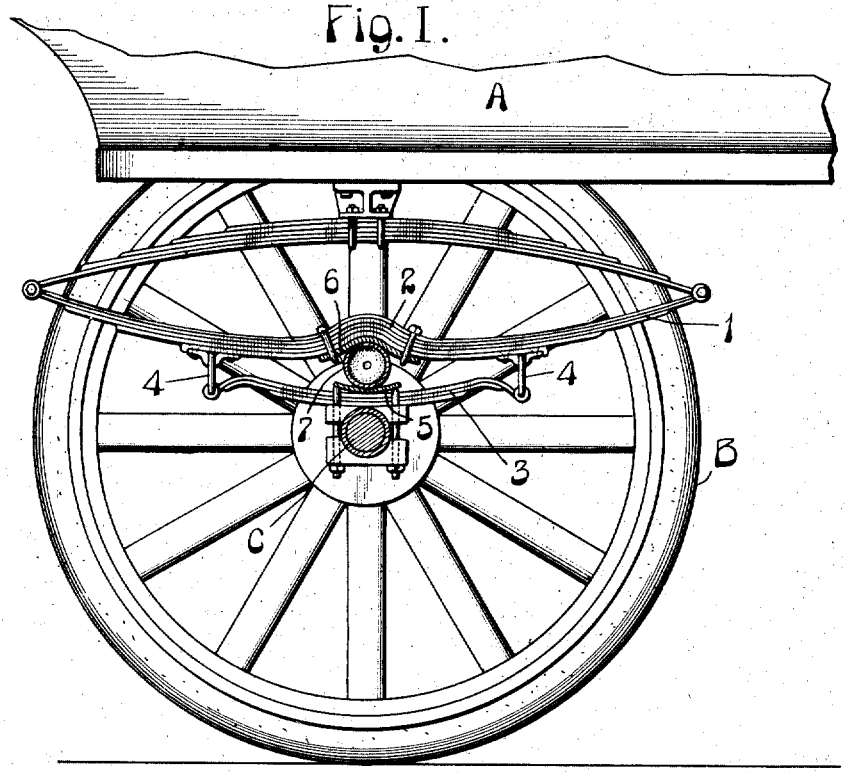
Fig. I.
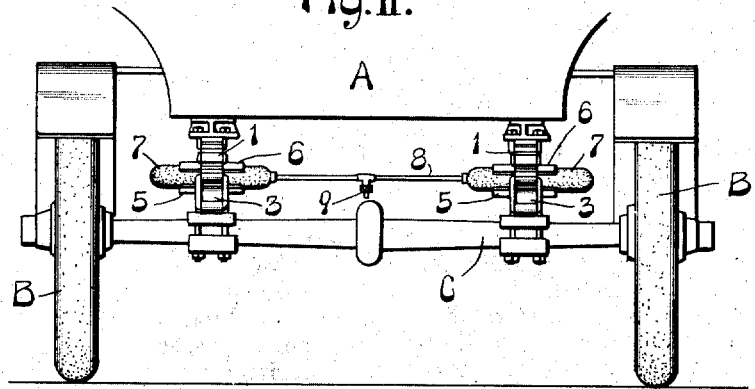
Fig. II.
Attest
Inventor:
C. A. Garvey

UNITED STATES PATENT OFFICE.

CHRISTOPHER A. GARVEY, OF ST. LOUIS, MISSOURI.

SHOCK-ABSORBER FOR VEHICLES.

991,437. Specification of Letters Patent. Patented May 2, 1911.

Application filed March 9, 1910. Serial No. 548,125.

*To all whom it may concern:*

Be it known that I, CHRISTOPHER A. GARVEY, a citizen of the United States of America, residing in the city of St. Louis, and State of Missouri, have invented certain new and useful Improvements in Shock-Absorbers for Vehicles, of which the following is a full, clear, and exact description, reference being had to the accompanying drawings, forming part of this specification.

My invention relates to that character of devices utilized in vehicles, and more particularly in motor vehicles, for the absorption of the shocks to which the ground wheels of the vehicles are subjected in order that the full force of such shocks may not be transmitted to the bodies of the vehicles.

One of the objects of my present invention is to provide a shock absorber of the kind named that is located immediately above the axle of the vehicle beneath the main springs and which, therefore, provides for its taking the force of the shocks directly from the axle, instead of aside from said axle.

A further object of the invention is to provide a construction in which the shock absorber is located as stated, and whereby there is only slight additional elevation of the main spring and the body of the vehicle, due to the presence of the shock absorber at the point named.

Figure I is a view partly in elevation and partly in vertical cross section of a portion of a vehicle equipped with my shock absorber. Fig. II is an end view of the vehicle with the shock absorber therein.

In the accompanying drawings:—A designates the body of a vehicle, B the ground wheels, and C one of the vehicle axles supported by the ground wheels B.

1 designates main springs located above the axle C and extending transversely thereof, these springs being shown in the drawings as of the elliptic type, although they may be of semi-elliptic, or other suitable type. The main springs 1 are attached to the vehicle body A in any suitable manner.

3 designates auxiliary springs beneath the main springs and which, like the main springs, extend transversely of the axle C. These auxiliary springs, which as shown are weaker than the main springs, are suitably secured to the axle and their outer ends are flexibly connected to the main springs by suitable means, such as shackles 4, in order that the auxiliary springs may move resiliently upon downward and upward movements of the main springs.

5 designates shoes located upon the auxiliary springs 3 and extending longitudinally of the vehicle axle, the said shoes being curved transversely, as seen in Fig. I. These shoes may be secured in any suitable manner to the auxiliary springs, or the axle.

6 are saddles secured to the main springs immediately above the shoes 5, and which extend parallel with the shoes 5. The saddles 6 are arched transversely and they fit within arches 2 at the centers of the main springs provided with an object in view to be hereinafter stated.

7 designates pneumatic cushions extending in alinement with the vehicle axle and occupying positions between the shoes 5 and the saddles 6. These pneumatic cushions are elongated in shape and they are preferably connected by a pipe 8 that may be, and preferably is, of flexible tubing and is provided with an inlet valve 9, through which air may be injected to inflate the pneumatic cushions.

The main springs are provided with the arched portions 2 in order that said springs may rest upon the pneumatic cushions 7 without incurring objectionable elevation of the main springs above the vehicle axle and consequently objectionable elevation of the body of the vehicle supported by the main springs, which objectionable elevation of the vehicle body above the vehicle axle would render it difficult to maintain the equilibrium of the vehicle body.

It will be readily appreciated that in the practical use of a vehicle equipped with my shock absorber, the auxiliary springs 3 and the pneumatic cushions 7 serve to carry a light or ordinary load, and in the event of the vehicle wheels striking an obstruction, or entering into a depression in the roadway, these members yield readily and their resilience provides for the force of the shocks incurred by the ground wheels being taken up by the pneumatic cushions, instead of being transferred to the main springs and therefrom to the vehicle body. Further, that inasmuch as the pneumatic cushions are located immediately above the axle and between said axle and the main springs, the force of any shock delivered from the ground wheels to the axle is received directly by the pneumatic cushions, with the result of entirely relieving the main springs of the shock, a result that cannot be accomplished where the pneumatic cushions are located aside from the positions stated. I also desire to direct attention to the fact that due to the main springs being connected to the auxiliary springs in the manner specified and the pneumatic cushions being loosely seated between the shoes 5 and the saddles 6, there is opportunity for swinging movement of the vehicle body and the main springs in backward and forward directions following the occurrence of shocks to the ground wheels of the vehicle and that in such swinging movements the pneumatic cushions, which are cylindrical in cross section, as shown, roll readily between the lower and upper bearings provided therefor, thereby avoiding strain upon the pneumatic cushions such as would be incident to the cushions if they were mounted in fixed positions above the vehicle axle.

I claim:—

1. The combination, with a vehicle axle, vehicle body and main springs; of auxiliary springs secured to the axle and to the main springs and cylindrical cushions located parallel with the axle between the main springs and the auxiliary springs.

2. The combination, with a vehicle axle, vehicle body and main springs; of auxiliary springs secured to the axle and to the main springs and cylindrical pneumatic cushions located parallel with the axle between the main springs and the auxiliary springs.

3. The combination, with a vehicle axle, vehicle body and main springs; of auxiliary springs secured to the axle and to the main springs and cylindrical pneumatic cushions having a connecting pipe provided with an inlet valve and located parallel with the axle between the main springs and the auxiliary springs.

4. The combination, with a vehicle axle, vehicle body and main springs; of auxiliary springs secured to the axle and to the main springs, transversely curved shoes located upon and secured to the auxiliary springs parallel with the axle, transversely curved saddles secured to the main springs parallel with the curved shoes, and a cylindrical cushion located between the shoes and the saddles.

In testimony whereof, I have hereunto affixed my signature, this 4th day of March, 1910.

CHRIS. A. GARVEY.

In the presence of—
A. J. McCAULEY,
EDNA B. LINN.